United States Patent
Sartain et al.

(10) Patent No.: US 6,315,211 B1
(45) Date of Patent: Nov. 13, 2001

(54) HARDWIRED OR BATTERY POWERED DIGITAL THERMOSTAT

(75) Inventors: John M. Sartain; Carl J. Mueller; Bartholomew L. Toth, all of St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/454,692

(22) Filed: Dec. 3, 1999

(51) Int. Cl.[7] .............................. F23N 5/20; G05D 23/00
(52) U.S. Cl. ........................... 236/46 R; 62/175; 307/66
(58) Field of Search ..................... 236/46 R; 62/175; 165/238, 268; 307/66

(56) References Cited

U.S. PATENT DOCUMENTS

| | | | |
|---|---|---|---|
| 4,267,966 | * | 5/1981 | Neel et al. ........................ 236/46 A |
| 4,365,167 | * | 12/1982 | Weimer et al. .................... 236/46 R |
| 4,431,134 | * | 2/1984 | Hendricks et al. ................ 236/46 R |
| 5,251,813 | * | 10/1993 | Kniepkamp ....................... 236/46 R |

OTHER PUBLICATIONS

Columbus Electric's Installation Manual for Discovery Series Thermonstats; cover page and pp. 1–4; Sep. 11, 1995; manual.

Portions of Columbus Electric's Home Page; general Thermostat pages and Discovery Thermostat pages; Jan. 13, 2001; www.columbus.thomasregister.com.

* cited by examiner

Primary Examiner—William Wayner
(74) Attorney, Agent, or Firm—Harness, Dickey & Pierce, P.L.C.

(57) ABSTRACT

An electronic digital thermostat adapted for installation in locations with or without an external power supply preferably includes a compartment for receiving a replaceable internal power supply, such as a batteries, for powering the thermostat if an external power supply is not available, and a connector for connecting the thermostat to an external power supply for powering the thermostat when the external power supply is available. The thermostat is configured to preferentially draw power from an external power supply connected to the thermostat, if power from an external power supply is available, and draw power from an internal power supply connected to the thermostat, if power from an external power supply is not available. An additional power backup, such as a capacitor, may be provided to maintain power to the thermostat for short durations when power is unavailable from both the internal power supply and the external power supply.

20 Claims, 4 Drawing Sheets

HARDWIRED OR BATTERY POWERED DIGITAL THERMOSTAT

FIELD OF THE INVENTION

This invention relates to thermostats and, more particularly, to a digital thermostat having dual power options adapted for installation in locations with or without an external power supply.

BACKGROUND OF THE INVENTION

Thermostats for controlling climate control systems generally fall into two broad categories: (1) mechanical thermostats and (2) electronic digital thermostats. A typical mechanical thermostat, such as for a multi-stage thermostat application, is connected to an alternating current (AC) power supply, normally a transformer. However, mechanical thermostats do not require continuous electrical power.

On the other hand, a typical digital thermostat, such as one that is multi-stage, requires continuous power for thermostat components such as a microcomputer and thermostat control circuit. These component parts require power at all times. Therefore, digital thermostats need additional connections to a power supply, such as a transformer, to satisfy these power requirements.

Thus, when replacing a mechanical multi-stage thermostat with a digital multi-stage thermostat, an additional wire is usually required to power and maintain operation of the digital thermostat. When replacing one digital thermostat with another digital thermostat, the additional power connection wire is normally present.

When installing a digital thermostat for a new application, such as when building a new house, providing continuous power for the digital thermostat by adding the necessary extra power wire is relatively easy. However, in retrofit applications, and specifically, when replacing a mechanical thermostat with a digital thermostat, providing an additional wire for electrical power can be difficult, time consuming and costly.

Therefore, what has been needed is a digital thermostat having multiple power capabilities that is adapted for both new installations and for retrofit installations (when an external power supply is not available, because all necessary connections are not present).

SUMMARY OF THE INVENTION

The thermostat of the present invention provides dual power supply compatibility allowing for installation and operation in both new and retrofit applications. The thermostat is adapted to draw power from either an external AC power supply (i.e., transformer) or an internal replaceable power supply (e.g., replaceable batteries). If the thermostat is connected to an external power supply, the replaceable internal power supply may provide extended duration backup power in the event of external power failure.

According to one aspect of the present invention, an electronic thermostat for controlling the operation of a climate control system is adapted for installation in locations with or without an external power supply. The thermostat includes a thermostat circuit, a compartment for receiving a replaceable internal power supply, a connector for connecting the thermostat circuit to the replaceable internal power supply in the compartment, for powering the thermostat circuit, and a connector for connecting the thermostat circuit to the external power supply for powering the thermostat. The electronic thermostat is further configured such that the thermostat preferentially draws power from the external power supply connected to the thermostat, if power from the external power supply is available, and from the internal power supply connected to the thermostat, if power from the external power supply is not available. The replaceable internal power supply is preferably at least one replaceable battery.

Additionally, the electronic thermostat is preferably provided with an energy reduction device adapted to reduce energy consumption of the thermostat when power from the external power supply is not available, with the thermostat drawing power from the internal power supply. Further, an energy storage device can be provided for powering the thermostat for a short duration if power from both the external power supply and the internal power supply are not available. The energy storage device may be a capacitor or super-capacitor. A programmed memory storage device may also be provided to the electronic thermostat for maintaining thermostat program information when power from both the external power supply and the internal power supply are not available. The programmed memory device may be an electrically erasable programmable read only memory.

According to another aspect of the present invention, an electronic digital thermostat for controlling a climate control system is preferably powered by at least one of the following: a replaceable internal power supply, which is preferably at least one battery, and an external power supply. The thermostat includes a compartment for receiving the replaceable internal power supply, a connector for connecting the thermostat to the internal power supply in the compartment for powering the thermostat, and a connector for connecting the thermostat to the external power supply for powering the thermostat. The thermostat is preferably configured such that the thermostat preferentially draws power from the external power supply connected to the thermostat, if power from the external power supply is available, and from the internal power supply connected to the thermostat, if power from the external power supply is not available. The thermostat further comprises an energy reduction device, which may reduce energy consumption of the thermostat, when power from an external power supply is not available. In this event, when power becomes unavailable from the external power supply, the thermostat draws a reduced amount of power from the internal power supply. The internal power supply preferably is configured to provide power for more than a short duration, with the thermostat operating normally for an extended period of time using the internal power supply.

Further, an energy storage device, preferably a super capacitor, may be provided for powering the thermostat for a short duration if power from both the external power supply and the internal power supply are not available. A programmed memory storage device, such as an electrically erasable programmable read only memory, may also be provided for maintaining thermostat program information when power from both the external power supply and the internal power supply are not available.

According to still another aspect of the present invention, a method of powering an electronic thermostat includes providing power to the electronic thermostat in locations with or without an external power supply. The method comprises the steps of powering the thermostat from an external power supply connected to the thermostat, if power from the external power supply is available, and powering the thermostat from an internal power supply connected to the thermostat, if power from the external power supply is not available. Additional steps may include powering the thermostat from an energy storage device or storing thermostat program information in a programmed memory storage device if power from both the external power supply and the internal power supply are not available.

Therefore, the present invention provides numerous novel features and advantages over prior thermostats. In particular, the invention provides a thermostat, and preferably, a digital multi-stage thermostat that can be powered by a replaceable internal power supply or an external power supply. This provides adaptability for both new installations and retrofit installations of existing thermostats (in particular, replacement of mechanical thermostats with digital thermostats). The adaptability provides ease in installation and savings in both labor and cost when retrofitting an existing system.

These and other features and advantages will be in part apparent and in part pointed out in a more detailed description of the various embodiments and aspects of the invention as set out below.

DETAILED DESCRIPTION OF THE PREFERRED EMBODIMENTS

Figure 1:
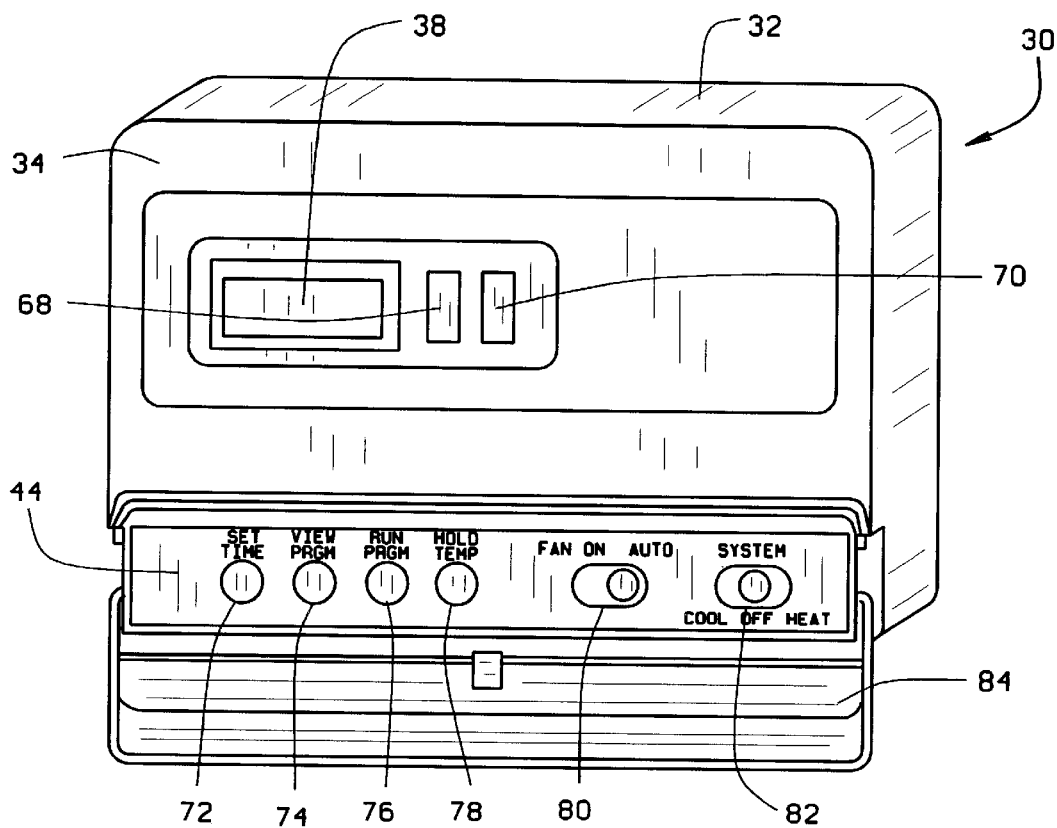
FIG. 1 is a front plan view of a thermostat constructed according to the principles of the present invention.
Figure 3:
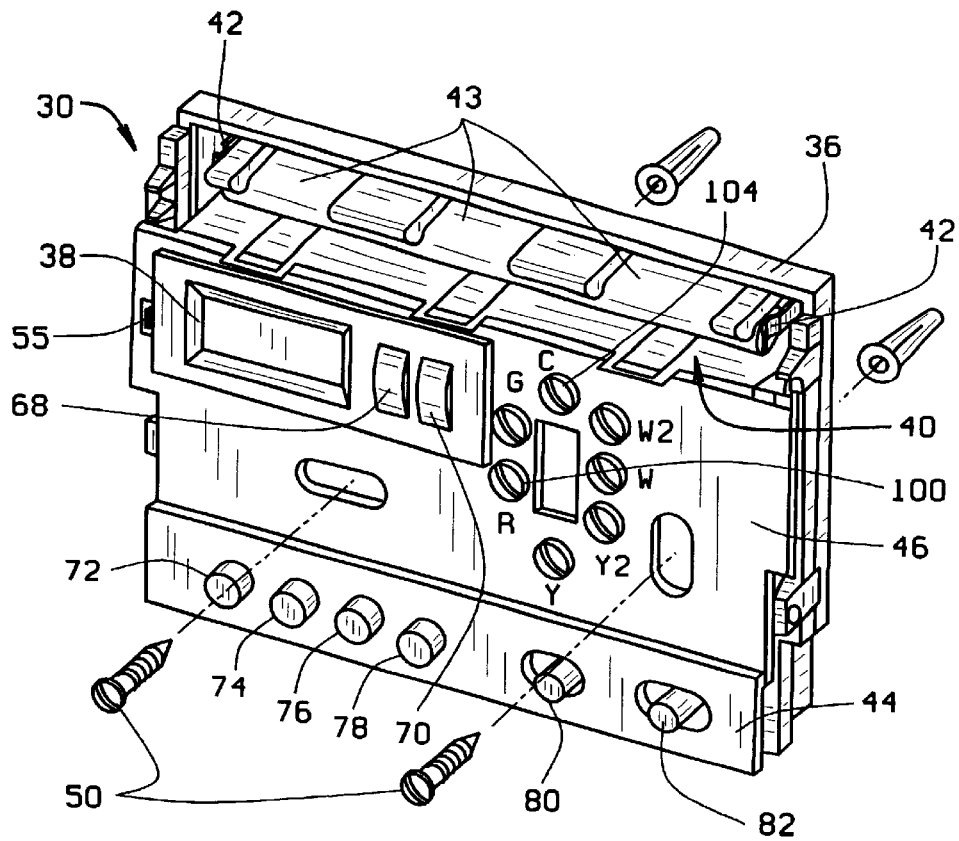
FIG. 3 is a perspective view of the base of the thermostat of FIG. 1.
Figure 4:
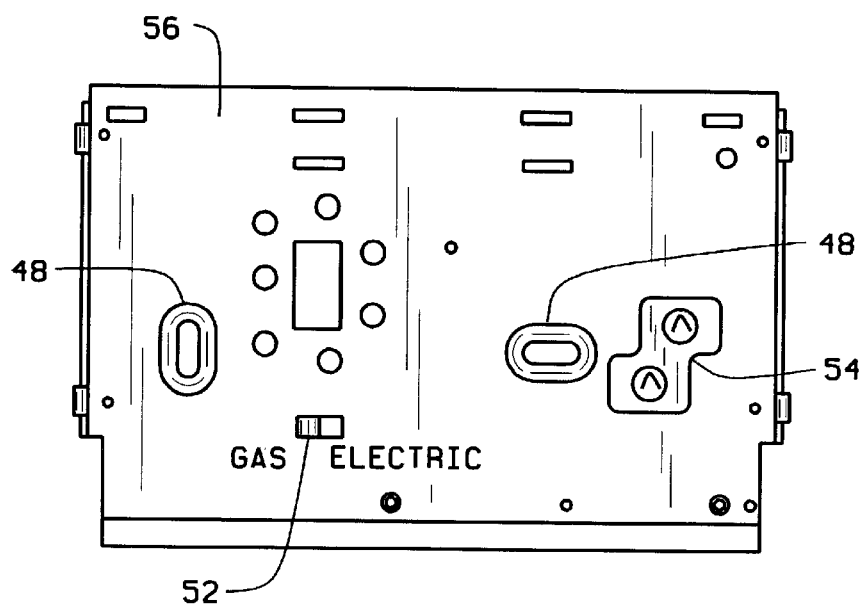
FIG. 4 is a rear plan view of the thermostat of FIG. 1.

A thermostat adapted for drawing power from a replaceable internal power supply, or an external power supply, is designated generally by reference numeral 30 in FIGS. 1 and 3. The thermostat 30 is of the type for use in connection with a climate control system, such as a heating/cooling system.

In the preferred embodiment, the thermostat 30 is a multi-stage electronic digital thermostat having a housing 32 with a removable front face 34 and a thermostat base 36. The thermostat base 36 is provided with a liquid crystal display (LCD) 38, a compartment 40 with connectors 42 for connection to a replaceable internal power supply 43, and a user input pad 44 on a front panel 46. Additionally, mounting holes 48 are provided to the thermostat base 36 for mounting the thermostat 30 to a wall or other desirable location using screws 50 or other suitable connectors.

A selector switch 52 and an energy management control 54 are provided on a back face 56 of the thermostat base 36. Depending upon the setting of the selector switch 52, the thermostat 30 may be connected to either a heater or heat pump system. The energy management control 54 provides for powering a heating system up to 30 minutes before a programmed setting of the thermostat 30 to gradually raise the room temperature to the programmed set point temperature in an efficient stage of heat. Additionally, a reset button 55 may also be provided on the front panel 46 to clear and reset the user programmed information of the thermostat 30.

Figure 2A:
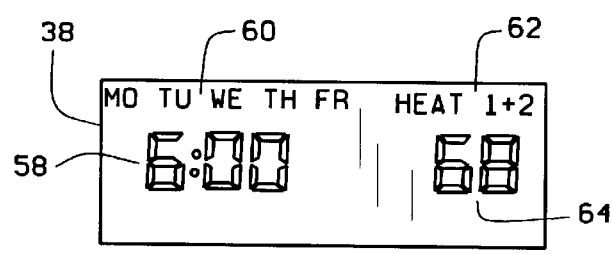
FIG. 2a is an exploded view of the liquid crystal display of the thermostat of FIG. 1.
Figure 2B:
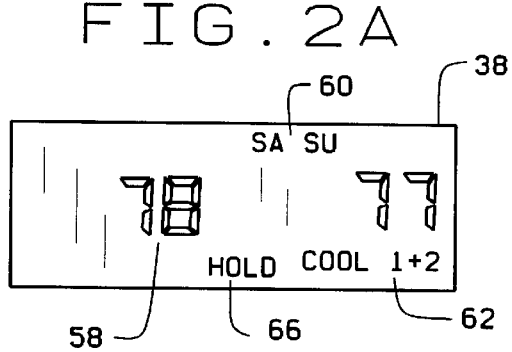
FIG. 2b is an exploded view of an alternate liquid crystal display of the thermostat of FIG. 1.

The LCD display 38, as shown in FIGS. 2a and 2b, preferably alternately displays the current time and room temperature on characters 58, displays the day of the week on characters 60, displays the mode of operation of the thermostat 30, such as HEAT or COOL, on characters 62, displays the current programmed set temperature on characters 64, and may indicate a HOLD mode on characters 66.

In general, the up arrow button 68 and down arrow button 70 are pressed to select or set certain features or functions of the thermostat 30 (e.g., raise and lower the programmed set temperature, respectively). The SET TIME button 72 is used to set the current time of day, the VIEW PRGM button 74 is used to view the current programmed information, the RUN PRGM button 76 activates the function being programmed and the HOLD TEMP button 78 maintains the temperature at a specific setting.

A fan switch 80 is provided to select between a continuous fan operation mode when "FAN ON" is selected and an automatic programmed mode of operation when AUTO is selected. A SYSTEM switch 82 is provided to select a cooling mode (COOL), a heating mode (HEAT) or a disabled or off mode (OFF).

The thermostat 30 may also be provided with additional features and functions such as toggling the temperature display between Celsius and Fahrenheit by pressing the SET TIME button 72 and HOLD TEMP button 78 simultaneously. It should be appreciated by one skilled in the art that additional features and functions may be added to the thermostat 30 without departing from the scope of the invention.

When reference is made to pressing or using a button or using a switch, it should be understood by one skilled in the art that that this refers to a user pressing the button or moving the switch that corresponds to the specific programming function desired. The buttons may be actual depressible buttons or simply pressure or contact sensitive buttons or another suitable input device. The switches may be sliding or toggle switches or another suitable input device. The LCD display 38 displays programming information that is manually entered by a user pressing the desired button or selecting the function by using a switch.

The thermostat 30 of the present invention is also preferably provided with a cover 84 hingedly attached to the bottom side of thermostat 30 on the front panel 46, as shown in FIG. 1. This allows a user to close the cover 84 over the user input pad 44, thereby hiding the buttons and switches, preventing inadvertent operation of the buttons and switches, and protecting the buttons and switches from exterior elements, such as dirt and dust.

The thermostat 30, to this point has been described with reference to conventional component parts, such as the series 1F80 thermostats sold by White-Rodgers Division of Emerson Electric Co. It should be apparent to one skilled in the art that the thermostat 30, heretofore described, may be modified and variations may be provided, such that the novel features described below may be incorporated with the thermostat 30 as well as any digital thermostat for controlling operation of a climate control system.

Figure 5:
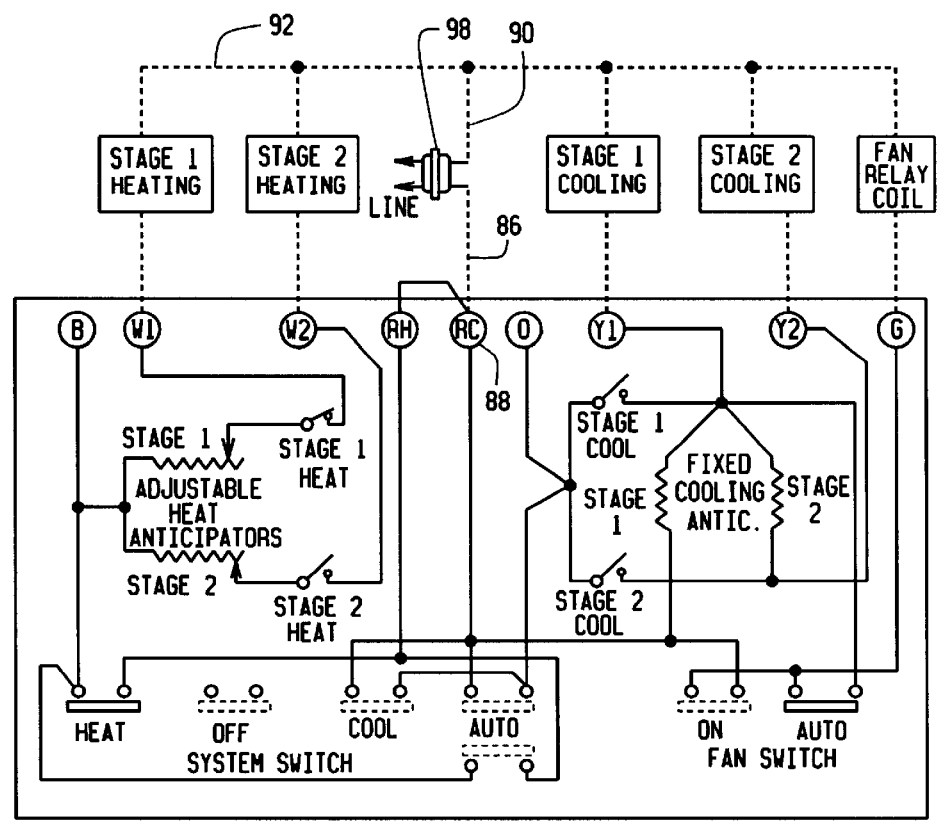
FIG. 5 is a schematic wiring diagram of a typical mechanical multi-stage thermostat.

Generally, multi-stage mechanical thermostats, such as those for light commercial applications, do not require continuous power and therefore are not hardwired to both sides (i.e., 24 volt (or hot) and common or neutral) of a transformer for delivering electrical power. Thus, as shown in the schematic wiring diagram in FIG. 5, a typical mechanical multi-stage thermostat is connected to an AC power supply, which is usually a transformer 98, with one wire 86 (24 volt) connected to a thermostat terminal RC 88 and another wire 90 (common or neutral) connected to a common side 92 of the heating/cooling relays. This typical mechanical multi-stage thermostat as shown in FIG. 5 does not consume or require continuous power, and therefore only wire 86 is required to be connected to the thermostat.

Figure 6:
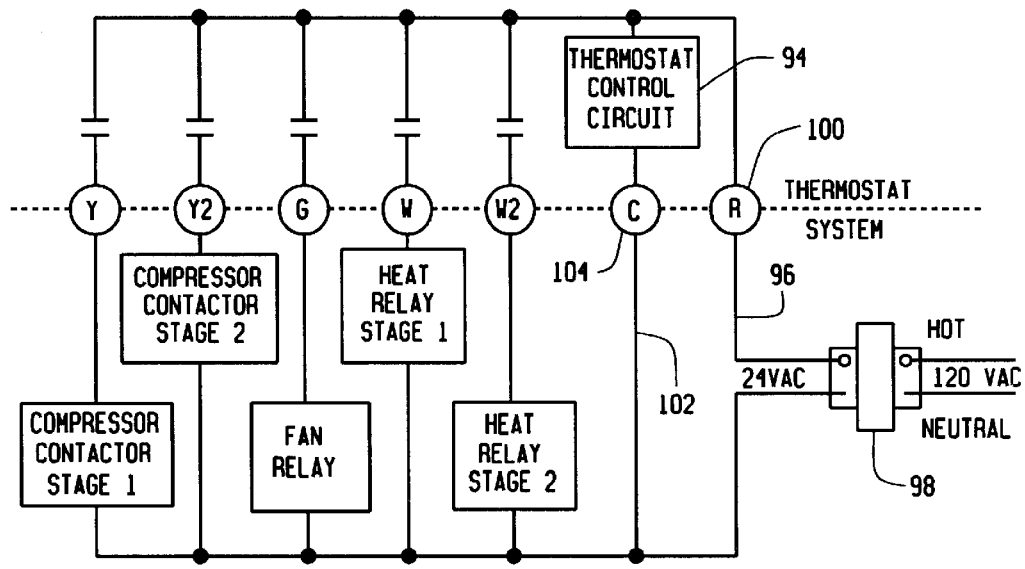
FIG. 6 is a schematic wiring diagram of a typical digital multi-stage thermostat.

A digital multi-stage thermostat, shown in a schematic wiring diagram in FIG. 6, has continuous power requirements for some of its component parts, including a microcomputer and a thermostat control circuit 94. Typically, wire 96 (24 volt) is connected from the transformer 98 to a thermostat terminal R 100 and wire 102 (common or neutral) is connected from the transformer 98 to a thermostat terminal C 104 to provide continuous power to the thermostat 30. Thus, both sides of the transformer 98 (i.e., system hot (24 volt) and neutral) are needed to power the thermostat 30 and must be connected directly to the thermostat 30.

When replacing a mechanical (multi-stage) thermostat with a digital (multi-stage) thermostat, another power line connection, such as wire 102 (common or neutral), is required to provide continuous power to operate the thermostat. In most replacement situations, this means that a separate power supply line must be installed, increasing the complexity and the expense of the replacement installation. However, the thermostat 30 of the present invention is provided with compartment 40 to provide for connection to a replaceable internal power supply 43, such as standard AA alkaline batteries, thus eliminating the need to provide a new power line.

Where there is a power supply line such as wire 102, the thermostat 30 of the present invention operates with DC regulated power provided from the transformer 98 through a linear regulator. However, if a power supply is not present and a new one is not installed, the thermostat is powered by the replaceable internal power supply.

It should be understood that when reference is made to a situation where there is no external power supply, this means that no external power is available to provide continuous power (i.e., the extra power line connection (neutral or common) is not present). However, power is still present from the transformer to provide power to, for example, the heating/cooling relays through other parts of the thermostat (e.g., thermostat relay contacts).

Figure 7:
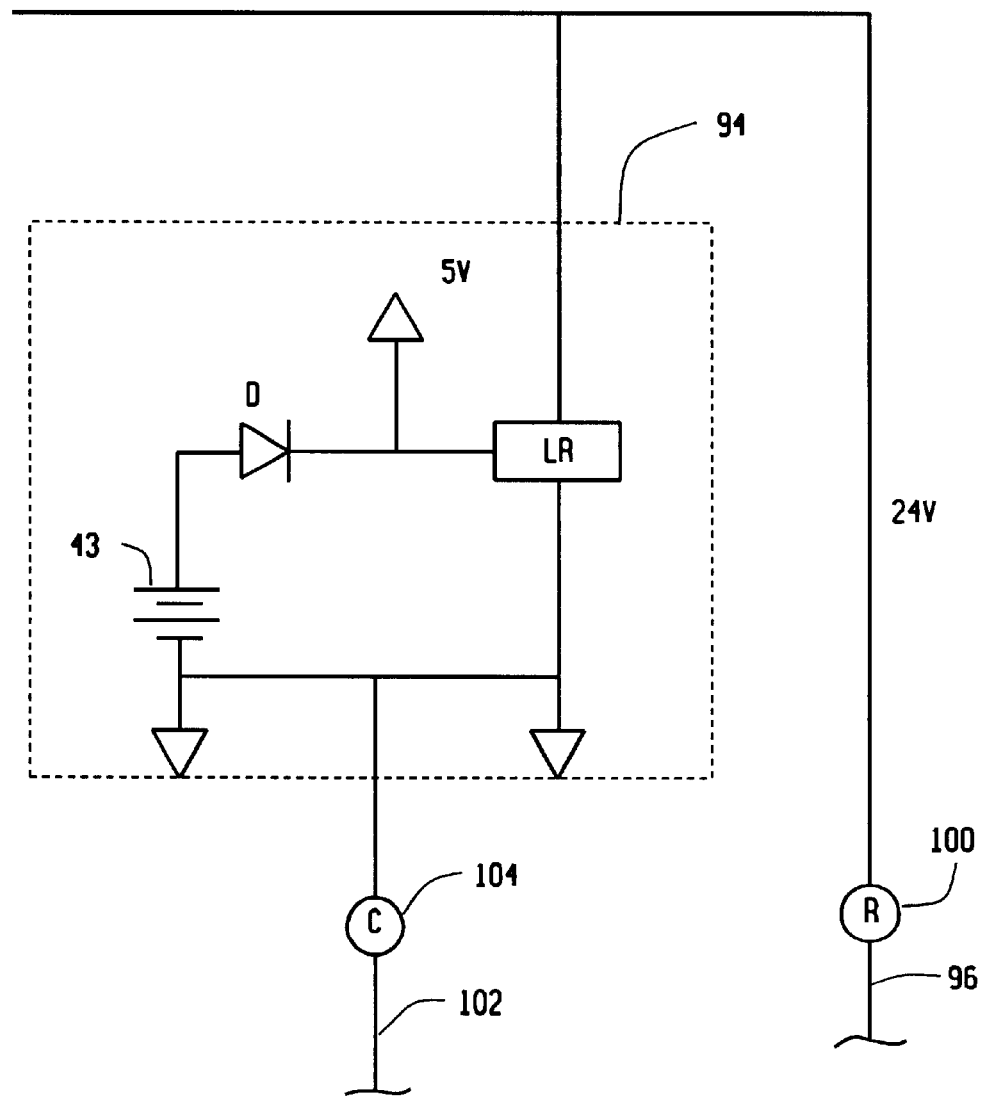
FIG. 7 is a schematic wiring diagram of the thermostat of FIG. 1 showing a thermostat control circuit constructed according to the principles of the present invention.

If both power lines 96 and 102 are present, power from an external power supply is provided such that terminal R100 is connected to 24 volt (hot) and terminal C 104 is connected to the neutral or common side of the 24 volt power supply. As shown in FIG. 7, a linear regulator LR is connected to the transformer 98 through terminal R100. This provides power to the thermostat 30 and back biases or reverse biases a diode D between the regulated external power supply and the replaceable internal power supply 43, resulting in no power being provided to the thermostat 30 from the replaceable internal power supply 43. However, when wire 102 is not present (e.g., an external power supply is not present and a new one is not installable, or in the event of external power supply failure), no power is provided to the diode from the external power supply through the linear regulator, the diode is forward biased, and power (about 4.5 volts) is supplied to the thermostat 30 by the replaceable internal power supply 43, which is preferably 3 AA batteries.

An energy storage device, such as a capacitor or supercapacitor, may be provided as a backup for all or some of the power requirements of the thermostat 30 for short time durations. Additionally, a programmed memory storage device, such as an electrically erasable programmable read only memory, may also be provided so that the thermostat 30 maintains user programmed information upon the loss of power. One such device is a 24C02N E$^2$PROM sold by Atmel Corporation.

Additional features may be provided to the thermostat 30 to conserve power or alert a user to a low power condition. For example, an energy reduction device may be provided, such that a real time clock may be programmed either to stop, consume the lowest amount of microcontroller run current, or run continuously (with batteries or a capacitor) in the event of external power failure from the transformer 98 connected to the thermostat 30 by wire 102. Additionally, the LCD display 38 may be provided such that it blanks out and displays only "LOW BATTERY" when the replaceable internal power supply has reached a predetermined low level. Additionally, when this "LOW BATTERY" condition exceeds a certain predetermined time period, for example four weeks, the thermostat 30 may be preprogrammed to alert the user as to this "LOW BATTERY" condition, by raising the set point temperature during the summer or lowering the set point temperature during the winter by a predetermined set amount, such as 10 degrees Fahrenheit, until threshold temperatures are reached, for example 90 degrees Fahrenheit and 60 degrees Fahrenheit, respectively. Such a feature is disclosed in U.S. Pat. No. 5,251,813, owned by Emerson Electric Co., which disclosure is expressly incorporated herein by reference.

While the present invention has been described by reference to specific embodiments, it should be understood and apparent to those skilled in the art that modifications and variations of the invention may be constructed without departing from the scope of the invention. However, these changes are included within the teaching of the disclosure, and it is therefore intended that the invention be limited only by the scope of the claims appended hereto, and their equivalents.

What is claimed is:

1. An electronic multi-stage thermostat for controlling the operation of a climate control system, the thermostat being adapted for installation in locations with or without an external power supply, the thermostat comprising a compartment for receiving a replaceable internal power supply, and a connector for connecting the thermostat to the replaceable internal power supply in the compartment for powering the thermostat, and a connector for connecting the thermostat to the external power supply for powering the thermostat.

2. The electronic thermostat according to claim 1 wherein the thermostat is configured so that the thermostat preferentially draws power from the external power supply connected to the thermostat, if power from the external power supply is available, and from the internal power supply connected to the thermostat, if power from the external power supply is not available.

3. The electronic thermostat according to claim 2 wherein the replaceable internal power supply is at least one replaceable battery.

4. The electronic thermostat according to claim 3 further comprising an energy reduction device adapted to reduce energy consumption of the thermostat when power from the external power supply is not available with the thermostat drawing power from the internal power supply.

5. The electronic thermostat according to 4 further comprising an energy storage device for powering the thermostat if power from both the external power supply and the internal power supply are not available.

6. The electronic thermostat according to claim 5 wherein the energy storage device is a capacitor.

7. The electronic thermostat according to claim 6 further comprising a programmed memory storage device for maintaining thermostat program information when power from both the external power supply and the internal power supply are not available.

8. The electronic thermostat according to claim 7 wherein the programmed memory storage device is an electrically erasable programmable read only memory.

9. In an electronic digital multi-stage thermostat for controlling a climate control system, the thermostat powered by at least one of the following: a replaceable internal power supply and an external power supply, a compartment for receiving the replaceable internal power supply, a connector for connecting the thermostat to the internal power supply in the compartment for powering the thermostat, a connector for connecting the thermostat to the external power supply for powering the thermostat, with the thermostat configured such that the thermostat preferentially draws power from the external power supply connected to the thermostat, if power from the external power supply is available, and from the internal power supply connected to the thermostat, if power from the external power supply is not available.

10. The electronic thermostat according to claim 9 wherein the replaceable internal power supply is at least one battery.

11. The electronic thermostat according to claim 10 further comprising an energy reduction device adapted to reduce energy consumption of the thermostat when power from the external power supply is not available with the thermostat drawing power from the internal power supply.

12. The electronic thermostat according to 11 further comprising an energy storage device for powering the thermostat if power from both the external power supply and the internal power supply are not available.

13. The electronic thermostat according to claim 12 wherein the energy storage device is a capacitor.

14. The electronic thermostat according to claim 13 further comprising a programmed memory storage device for maintaining thermostat program information when power from both the external power supply and the internal power supply are not available.

15. The electronic thermostat according to claim 14 wherein the programmed memory storage device is an electrically erasable programmable read only memory.

16. A method for providing power to an electronic multi-stage thermostat in locations with or without an external power supply, the method comprising the steps of powering the thermostat from an external power supply connected to the thermostat, if power from the external power supply is available, and powering the thermostat from an internal power supply connected to the thermostat, if power from the external power supply is not available.

17. The method according to claim 16 further comprising the step of powering the thermostat from an energy storage device if power from both the external power supply and the internal power supply are not available.

18. The method according to claim 17 further comprising storing thermostat program information in a programmed memory storage device if power from both the external power supply and internal power supply are not available.

19. An electronic multi-stage thermostat for controlling a climate control system in multiple stages of operation, the multi-stage thermostat requiring power from at least two sources for providing continuous power and controlling operation of the climate control system, the electronic multi-stage thermostat comprising a compartment for receiving a replaceable internal power supply, a first connection for connecting the thermostat to external power sources for powering the thermostat when at least two external power sources are available, and a second connector for connecting the thermostat to the replaceable internal power supply in the compartment for powering the thermostat when only one external power source is available, with the first connector connected to the one external power source.

20. An electronic multi-stage thermostat for controlling a multistage climate control system, the system requiring a source of system power and a separate source of operational power to provide system power to the climate control system to operate the appropriate stage of the climate control system, the thermostat comprising a first connector adapted to be connected to an eternal source of system power, a second connector adapted to be connected to a separate external source of operational power, and an internal power supply to provide operation power to the thermostat if an external source of operational power is not connected to the second connector.

* * * * *